Patented Nov. 4, 1930

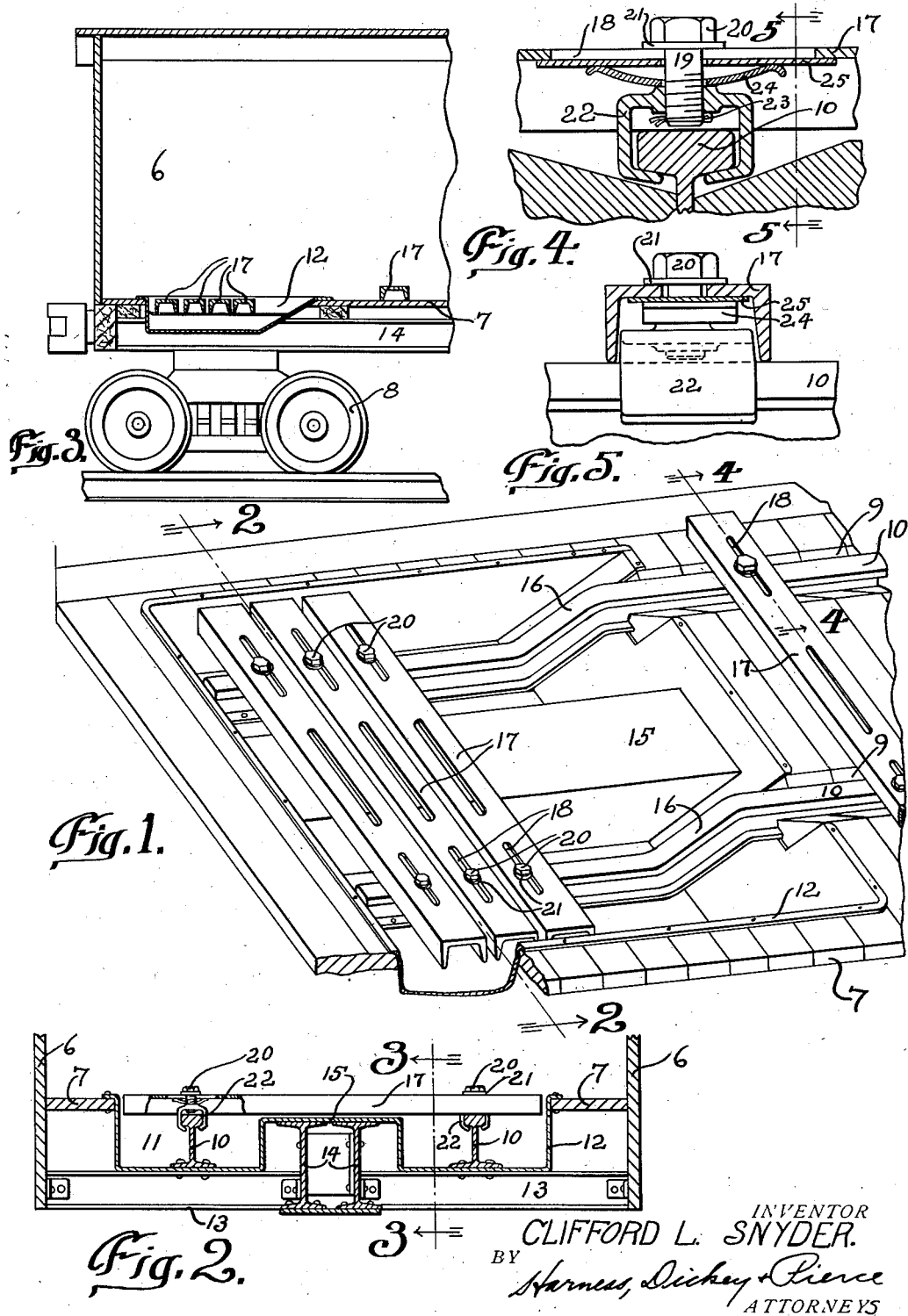

1,780,318

UNITED STATES PATENT OFFICE

CLIFFORD L. SNYDER, OF DETROIT, MICHIGAN, ASSIGNOR TO THE EVANS AUTO LOADING CO. INC., A CORPORATION OF DELAWARE

SHIPPING DEVICE

Application filed February 27, 1929. Serial No. 343,088.

It has heretofore been proposed to provide means in the floor of a freight car or the like to which may be secured means for holding a motor vehicle for shipment in the freight car. My invention encompasses such a construction wherein a plurality of movable members are provided for attachment of the vehicle to the freight car and wherein such members are not readily movable from the freight car.

My invention broadly contemplates the provision of means for storing such movable members in the freight car in such manner that they will be instantly available for use, but will be out of the way when it is not desired to use them.

More specifically, my invention contemplates the provision of a depression in the freight car floor within which the movable members may be stored and from which they may be moved around suitable guide ways to the desired position in the freight cars.

With the above and other objects in view, my invention consists in the arrangement, combination and construction of the various parts of my improved device as described in the specification, claimed in my claims and shown in the accompanying drawings, in which:

Fig. 1 is a perspective view of a portion of the freight car floor on which my invention is carried, certain portions being broken away.

Fig. 2 is a sectional view taken on line 2—2 of Fig. 1.

Fig. 3 is a longitudinal sectional view of one end of a freight car showing my invention applied thereto, the view through the freight car floor being substantially along the line 3—3 of Fig. 2.

Fig. 4 is a sectional view taken on line 4—4 of Fig. 1.

Fig. 5 is a sectional view taken on line 5—5 of Fig. 4.

I have shown a freight car indicated generally as 6, said car having a floor indicated generally as 7 and being mounted for movement upon conventional wheels 8.

The floor 7 is provided with a pair of spaced grooves or slots 9 along which extend a pair of rails 10.

Adjacent one or both ends of the freight car a recess 11 may be formed, into which is fitted a pan like member 12. The pan 12 may be mounted on a cross member or cross members 13, which extend in a plane beneath the floor of the freight car. The longitudinally extending I beams 14 may also assist in supporting the pan 12, the pan being formed with a bent up portion 15 adapted to fit over the I beams 14.

As is more particularly shown in Fig. 1, the rails 10 may be bent up as at 16 so as to diagonally extend from the level of the portion thereof extending along the freight car floor to the lower level of the pan 12.

A plurality of channel members 17 are provided, extending from one rail to the other. Each channel member 17 is provided with a slot 18 adjacent each end thereof through which the shank portion of a bolt 19 may extend. The heads 20 of the bolts 19, each bearing on a washer 21, will prevent the bolts passing entirely through the slots 18. Jaw like members 22 are provided for engagement with the rails 10 and each such member 22 is provided with an upper threaded aperture into which the threaded shank of a bolt 19 is screwed. The lower end of each bolt 19 is apertured to receive a cotter pin 23 so as to prevent disengagement of the bolt from the jaw like member. Between each jaw like member 22 and the adjacent portion of its channel member 17 is provided a spring member 24, as is particularly shown in Fig. 4. If desired a plate 25 may be positioned between each spring 24 and its channel 17 to provide a bearing for the spring 24 at the top and preventing the spring passing through its adjacent slot 18.

Assuming that it is not desired to ship motor vehicles or any similar cargo, the channel cross members 17 may advantageously be stored in the pan 12. Inasmuch as the channel cross members are movable along the rails 10 by reason of their connection therewith through the jaws 22, they will be moved along the rails 10 into the wells 12. When it is desired to use the channel cross members for the purpose of securing motor vehicles or the like in the car, they may be moved along the rails 10 into the main portion of the freight car. When they have been brought into the desired location, the bolts 19 may be rotated, through the heads 20, to clamp the jaws 22 to the rails 10 at the desired position. When it is desired to release the channel cross members and move them to some other point along the rails 10, the bolts 19 may be unscrewed. In doing this, the springs 24 will tend to push the jaws 22 downwardly so that the bottoms thereof will not frictionally engage the bottoms of the rails 10 and free movement may be had.

I desire it to be understood that any of various types of guide members may be employed in the freight car floor without departing from the spirit of my invention, the rails being shown merely as one illustrative way of securing the desired result.

I also desire it to be understood that various forms of attaching devices, other than the channel members 17, may be employed without departing from the spirit of my invention. Various other changes may be made in the arrangement, combination and construction of the various parts of my improved device without departing from the spirit of my invention and it is my intention to cover by my claims such changes as may be reasonably included within the scope thereof.

What I claim is:

1. In combination, a freight car or the like, a guideway adjacent the floor of the car, a member secured to the car and movable along the guideway, said member having means for attachment of a shipping device thereto, a pan in the car floor, extending beneath the surface of the floor and means for moving said member into said pan.

2. In combination, a freight car or the like, a guideway adjacent the floor of the car, a member secured to the car and movable along the guideway, said member having means for attachment of a shipping device thereto, a pan in the car floor, carried by the floor supports, said pan extending beneath the surface of the floor and means for moving said member into said pan.

3. In combination, a freight car or the like, a guide rail extending longitudinally along the floor thereof, one end of said rail being offset downwardly, and a member secured to and movable along said rail to positions either on the normal portion of said rail or on the depressed portion thereof, said member having means for attachment of a shipping device thereto.

4. In combination, a freight car or the like, a guide rail extending longitudinally along the floor thereof, one end of said rail being offset downwardly, and a member secured to and movable along said rail to positions either on the normal portion of said rail or on the depressed portion thereof, said member having means for attachment of a shipping device thereto, the amount of such rail offset being sufficient to position the top of said member in substantially horizontal alignment with the floor.

5. In combination, a freight car or the like having a depression in the floor adjacent one end thereof, a pair of rails extending longitudinally along the floor with the corresponding ends thereof offset downwardly into said depression, and a member secured to and movable along said rails to positions either on the normal portions thereof or on the depressed portions thereof, said member having means for attachment of a shipping device thereto, the amount of such rail offset being sufficient to position the top of said member in substantially horizontal alignment with the floor.

CLIFFORD L. SNYDER.